(12) United States Patent
Barois et al.

(10) Patent No.: US 11,848,867 B2
(45) Date of Patent: Dec. 19, 2023

(54) REGULATION METHOD INTENDED FOR REDUCING CONGESTION ON A MESH POWERLINE COMMUNICATION NETWORK

(71) Applicant: SAGEMCOM ENERGY & TELECOM SAS, Rueil Malmaison (FR)

(72) Inventors: Jérôme Barois, Rueil Malmaison (FR); Clément Terrien, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 183 days.

(21) Appl. No.: 17/364,070

(22) Filed: Jun. 30, 2021

(65) Prior Publication Data
US 2022/0006742 A1 Jan. 6, 2022

(30) Foreign Application Priority Data
Jul. 1, 2020 (FR) ...................... 2006939

(51) Int. Cl.
*H04L 47/12* (2022.01)
*H04L 45/02* (2022.01)
(Continued)

(52) U.S. Cl.
CPC ............. *H04L 47/12* (2013.01); *H04L 45/02* (2013.01); *H04L 47/11* (2013.01); *H04B 3/54* (2013.01); *H04L 67/12* (2013.01)

(58) Field of Classification Search
None
See application file for complete search history.

(56) References Cited

U.S. PATENT DOCUMENTS

| 2004/0203820 A1* | 10/2004 | Billhartz | H04L 45/26 455/450 |
| 2005/0047418 A1* | 3/2005 | Kang | H04L 47/30 370/395.42 |

(Continued)

OTHER PUBLICATIONS

Sobral et.al., "LOADng-IoT: An Enhanced Routing Protocol for Internet of Things Applications over Low Power Networks", https://www.ncbi.nlm.nih.gov/pmc/articles/PMC6339092/, 2019, 26 pages (Year: 2019).*

(Continued)

*Primary Examiner* — Ajit Patel
*Assistant Examiner* — Liem H. Nguyen
(74) *Attorney, Agent, or Firm* — Williams Mullen; R. Brian Drozd

(57) ABSTRACT

A regulation method intended to reduce congestion in a mesh powerline communication network that includes a plurality of node devices, a route discovery request being sent by a source node device and requests being relayed by intermediate node devices to a destination node device. The regulation method is implemented by an intermediate node device, which can receive a plurality of route discovery requests, and includes the steps of: detecting a congestion situation when a number of requests received over a time window of predefined duration is above a predefined first threshold; identifying requests as important when the number of any one request received over the time window of predefined duration is above a second predefined threshold; and relaying solely requests identified as important.

7 Claims, 4 Drawing Sheets

(51) Int. Cl.
*H04L 47/11* (2022.01)
*H04B 3/54* (2006.01)
*H04L 67/12* (2022.01)

(56) References Cited

U.S. PATENT DOCUMENTS

| | | | | |
|---|---|---|---|---|
| 2010/0260185 | A1* | 10/2010 | Wang | H04L 47/12 |
| | | | | 370/392 |
| 2011/0261706 | A1* | 10/2011 | Fujiwara | H04B 3/54 |
| | | | | 370/252 |
| 2012/0320731 | A1* | 12/2012 | Johnson | H04L 67/12 |
| | | | | 370/216 |
| 2013/0250754 | A1* | 9/2013 | Vasseur | H04W 40/28 |
| | | | | 370/225 |
| 2013/0250811 | A1* | 9/2013 | Vasseur | H04W 40/023 |
| | | | | 370/254 |
| 2014/0226579 | A1* | 8/2014 | Roy | H04L 45/72 |
| | | | | 370/329 |
| 2014/0269704 | A1* | 9/2014 | Alexander | H04W 4/06 |
| | | | | 370/390 |
| 2014/0369359 | A1* | 12/2014 | Kondo | H04L 45/26 |
| | | | | 370/400 |
| 2015/0271062 | A1* | 9/2015 | Vijayasankar | H04B 3/542 |
| | | | | 370/252 |
| 2019/0296797 | A1* | 9/2019 | Teboulle | H04Q 9/14 |
| 2019/0356573 | A1* | 11/2019 | Chirikov | H04L 45/02 |
| 2020/0007435 | A1* | 1/2020 | Paida | H04L 47/22 |
| 2022/0337528 | A1* | 10/2022 | Tan | H04L 47/32 |

OTHER PUBLICATIONS

Mar. 8, 2021 Search Report issued in French Patent Application No. 2006939.

* cited by examiner

REGULATION METHOD INTENDED FOR REDUCING CONGESTION ON A MESH POWERLINE COMMUNICATION NETWORK

TECHNICAL FIELD

The present invention relates to the field of mesh powerline communication networks and more precisely a regulation method intended to reduce congestion on a mesh communication network.

PRIOR ART

In a mesh powerline communication PLC network comprising a plurality of node devices forming a mesh structure, a source node device transmits messages to a destination node device by means of node devices fulfilling a role of relay. Thus a message sent by the source node device to the destination node device passes through a route formed by the node devices fulfilling a role of relay as far as the destination node device.

In a mesh powerline communication PLC network relying a routing protocol of the reactive type, such as the LOADng protocol ("Lightweight On-demand Ad hoc Distance-vector Routing Protocol-Next Generation"), a source node device discovers a route to a given destination node by broadcasting a route discovery request through the mesh communication network. Since a message broadcast by a node device is in general not visible at every point of said mesh communication network, the source node device broadcasts the route discovery request to each of its adjacent node devices, or in other words to each node device located within range of the source node device in the mesh communication network. Said adjacent node devices then in their turn transmit the route discovery request to their respective adjacent node devices. In the case where a node device is directly adjacent to the destination node device, it transmits the route discovery request solely to said destination node device. A plurality of route discovery requests are thus broadcast gradually through various paths in the mesh communication network until the destination node device is reached. The destination node device then selects an optimum route from the various paths according to cost information associated with each route discovery request received and transmits, via said optimum route, a route discovery reply to the source node device making it possible to activate the route.

When a route between a source node device and a destination node device is broken, the source node device attempts to repair the route by broadcasting a route repair request through the mesh communication network. However, when the mesh communication network is disturbed or a plurality of routes must be repaired simultaneously, such a route repair mechanism causes a transmission of numerous route repair requests in the mesh communication network and causes congestion on the mesh communication network. Other routes may then be broken in their turn, causing the broadcasting of new route repair requests or causing an increase in the congestion on the mesh communication network. As a repercussion, the mesh communication network may then suffer congestion that may last up to several days, preventing the transmission of data other than discovery-request messages or route-repair request messages.

It is then desirable to overcome these drawbacks of the prior art.

It is in particular desirable to provide a solution that makes it possible to quickly reduce congestion on the mesh communication network when routes are broken. It is also desirable to provide a solution for privileging the repair of optimum routes in the mesh communication network in a context of congestion.

DISCLOSURE OF THE INVENTION

One object of the present invention is to propose a regulation method intended to reduce congestion on a mesh communication network, the mesh communication network comprising a plurality of node devices communicating by powerline, a route request being sent by a source node device and the route request being relayed by gradual broadcasting by intermediate node devices to a destination node device, an intermediate node device being able to receive one or more route discovery requests. The regulation method is implemented by an intermediate node device of the mesh communication network and comprises the steps of: detecting a congestion situation when a number of route requests received over a time window of predefined duration is higher than a predefined first threshold; identifying, when a congestion situation is detected, route requests as being important, a route request being identified as important when the number of said route requests received over the time window of predefined duration is above a second predefined threshold; and relaying solely route requests identified as important.

Thus it is possible to quickly reduce congestion on the mesh communication network while making it possible to repair routes that have been broken, and while privileging the repair of routes for which an intermediate node device potentially fulfils an important relay role.

According to a particular embodiment, the method further comprises a step of: stopping the relaying of route requests identified as important when a total number of route requests identified as important and relayed after the congestion situation is detected reaches a predefined third threshold.

Thus, even when an intermediate node device potentially fulfils an important relay role for numerous routes in the mesh communication network, the quantity of route requests relayed by the intermediate node device during a congestion situation remains limited, which facilitates rapid decongestion of the mesh communication network.

According to a particular embodiment, the step of relaying solely route requests identified as important is performed by relaying as a priority the route requests the number of which received by the intermediate node device is the highest.

Repairing the routes for which the intermediate node device potentially fulfils the most important relay role is thus privileged.

According to a particular embodiment, the method further comprises steps of: recording, for each route request not relayed, an identifier of the source node that sent said route request; detecting an end of a congestion situation when the number of route requests received over the time window of predefined duration by the intermediate node device is lower than the predefined first threshold; and, when an end of congestion situation is detected, sending, to each node device an identifier of which is recorded, an invitation to send a new route request.

Thus, when a constructed or repaired route is not optimum since the request for said route has not intentionally been relayed by an intermediate node device during a congestion situation, it is possible to make an attempt to improve said route after the congestion situation has ended.

According to a particular embodiment, the route requests are route discovery requests and/or route repair requests.

The invention also relates to a computer program that comprises instructions causing the execution, by a node device in a mesh communication network, of the method mentioned above in any one of the embodiments thereof, when said instructions are executed by a processor of said node device.

The invention also relates to an information storage medium storing a computer program comprising instructions causing the execution by a node device in a mesh communication network of the method mentioned above in any one of the embodiments thereof, when said instructions are read and executed by a processor of said node device.

The invention also relates to a node device, referred to as an intermediate node device, intended to be used in a mesh communication network, the mesh communication network comprising a plurality of node devices communicating by powerline, the mesh communication network being such that, when a route request is sent by a source node device, the route request is relayed by gradual broadcasting by node devices to a destination node device, the intermediate node device being able to receive one or more route requests. The intermediate node device comprises: means for detecting a congestion situation when a number of route requests received over a time window of predefined duration is higher than a predefined first threshold; means for identifying, when a congestion situation is detected, route requests as being important, a route request being identified as important when the number of said route request received over the time window of predefined duration is higher than a predefined second threshold; and means for relaying solely route requests identified as important.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
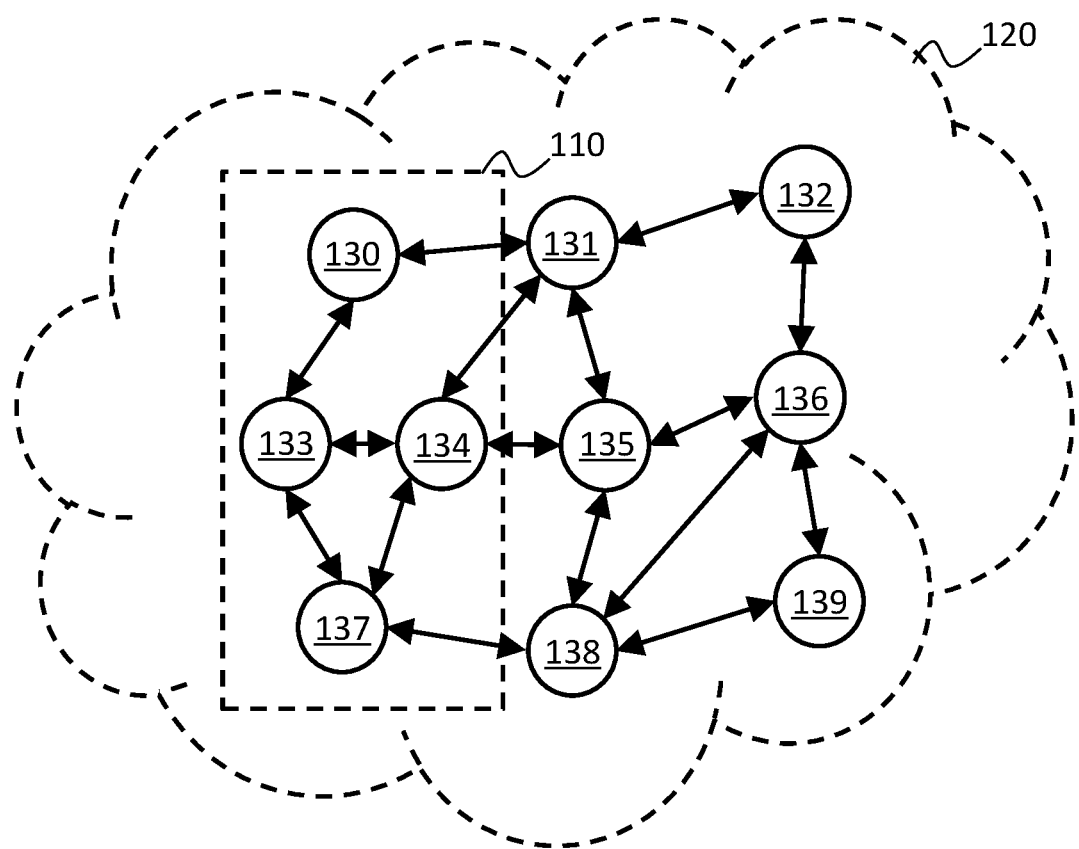
FIG. 1 illustrates schematically a mesh powerline communication network.

FIG. 1 illustrates schematically a mesh communication network 120. The mesh communication network 120 is for example an electrical supply network of the AMM ("Automated Meter Management") type. The mesh communication network 120 relies on powerline communications PLC to enable a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers.

The mesh communication network 120 therefore has a mesh structure, as shown schematically on FIG. 1 by means of arrows, where node devices fulfil the role of relays for increasing the range of the communications in the mesh communication network 120, as detailed hereinafter. Thus any one smart electricity meter has available potentially a plurality of paths for reaching the data concentrator, and vice-versa.

The present invention is thus particularly adapted to the context of the G3-PLC (registered trade mark) technology.

The mesh communication network 120 thus comprises a plurality of node devices 130, 131, 132, 133, 134, 135, 136, 137, 138, 139. A network neighbourhood is associated with each node device of the mesh communication network 120. On FIG. 1, the node device 133 is associated with a network neighbourhood 110 encompassing the node devices 130, 134 and 137. In the mesh communication network 120, a signal or a message broadcast by a node device (such as the node device 133) is in general not visible at every point in the mesh communication network. Each node device sending signals or messages then has a network neighbourhood, that is to say a subset of said mesh communication network 120 wherein every node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol-Next Generation"). Unlike the routing protocols of the proactive type that rely on a global knowledge of the network topology, the routing protocols of the reactive type rely on on-demand route discoveries, each node device of the network then needing solely to have knowledge of its own network neighbourhood for routing data in the mesh communication network 120.

To discover or reconstruct a suitable route in the mesh communication network 120 from a source node device (for example the node device 133) as far as a destination node device (for example the node device 132), it is known that the source node device broadcasts a route discovery request, called RREQ ("Route REQuest"). The route discovery request is received by each node device in the network neighbourhood of said source node device, and which relays said request by broadcast if said node device in question is not the destination node device. By gradual broadcasting (by successive hops), a plurality of route discovery requests are typically received by the destination node device, each of these requests having followed a different path in the mesh communication network 120.

The same applies for the route repair requests.

Each node device that originates a message, such as for example a route discovery or repair request, includes therein an identifier that is particular to it, as well as a sequence number, as defined in the LOADng protocol. This sequence number is a counter value particular to each node device of the mesh communication network 120. Each time a node device generates a new message, said node device increments its counter and includes the value of said counter in the message in question. Thus, when a node device receives a message, said node device analyses the identifier of the node device originating the message and the sequence number that are included in the message, and can determine whether the message received is actually a new message or a new copy of a message already received. The route repair and/or discovery requests are hereinafter referred to as route requests.

Each node device may however decide not to relay the route request, when one or more criteria are not met. In particular, before deciding to relay said route request, the node device in question typically checks whether said route request comprises information representing a route cost, from the source node device to the node device in question, that is better than the route cost represented by information contained in another route request previously received by the node device in question. In other words, the node device in question relays said route request by broadcasting if said request relates to a route request that followed, from the source node device to the node device in question, a pathway with a lower cost than any other route request previously received by the node device in question (and therefore for the same route discovery or repair).

The route cost may be based on one or more metrics. For example, the route cost is a number of hops experienced by the route request in question from the source node device. According to another example, the route cost is the result of a calculation that depends on the bandwidth of the links passed over, by the route request in question from the source node device. According to yet another example, the route cost is proportional to the latency experienced by the route request in question from the source node device. Other metrics may be used to establish a route cost, that is to say a transit cost, from the source node device to the destination node device.

When a node device decides to relay the route request by broadcasting, the node device in question updates the route cost information contained in said route request, so as to take into account the fact that said route request has passed through the node device in question. Thus, according to such a principle, a plurality of route requests typically arrive at the destination node device, each comprising cost information on the route that said route request followed to be propagated from the source node device to the destination node device. The pathway followed by said route request associated with the best route request is then selected to enable the source node device to transmit data to the destination node device. To activate the route in question, the destination node device transmits a reply, called RREP ("Route REPly"). This reply is relayed gradually, by successive hops, following the reverse path to the route discovery request that was associated with the best route cost. Each node device receiving the response updates an internal routing table, at the link layer of the ISO (International Standard Organization) model in order to indicate therein that any subsequent message transmitted in unicast mode from the source node device in question to the destination node device in question must be transmitted or relayed to such and such a node device of its network neighbourhood. In the link layer, also referred to as MAC (Medium Access Control) layer, the routing tables are preferentially implemented in an adaptation sublayer responsible for implementing the routing protocol in the mesh communication network 120. For example, this adaptation sublayer is in accordance with the 6LoWPAN (standing for "IPv6 over Low power Wireless Personal Area Networks") protocol, which was initially developed for supporting IPv6 in the context of the IEEE 802.15.4 standard and which was extended to the G3-PLC (registered trade mark) technology. It should be noted that the 6LoWPAN protocol is itself based on the routing protocol of the aforementioned reactive LOADng type.

A route between a source node device and a destination node device may be broken, because for example of routing difficulties related to interference on the mesh communication network 120. A route repair mechanism is then initialised and involves the source node device in question broadcasting a new route request, or more precisely a route repair request comprising a new sequence number. The route request being relayed by gradual broadcasting to the node devices of the mesh communication network 120, such a route repair mechanism increases the risk of the occurrence of a congestion situation on the mesh communication network 120, as already explained.

In order to avoid such a congestion situation, each node device can detect a start of congestion by comparing a route request rate (i.e. the number of route requests over a time window of predefined duration) received with a first predefined threshold, referred to as the saturation threshold. As long as the rate remains below the saturation threshold, the node device remains in a first mode, referred to as nominal mode, wherein a route request received is relayed systematically by broadcasting in the network neighbourhood of said node device. When the rate reaches or exceeds the saturation threshold, the node device goes into a second mode, referred to as degraded mode. In the degraded mode, the node device relays only some of the route requests received and thus limits the number of messages transmitted, which reduces the congestion on the mesh communication network 120.

Figure 2:
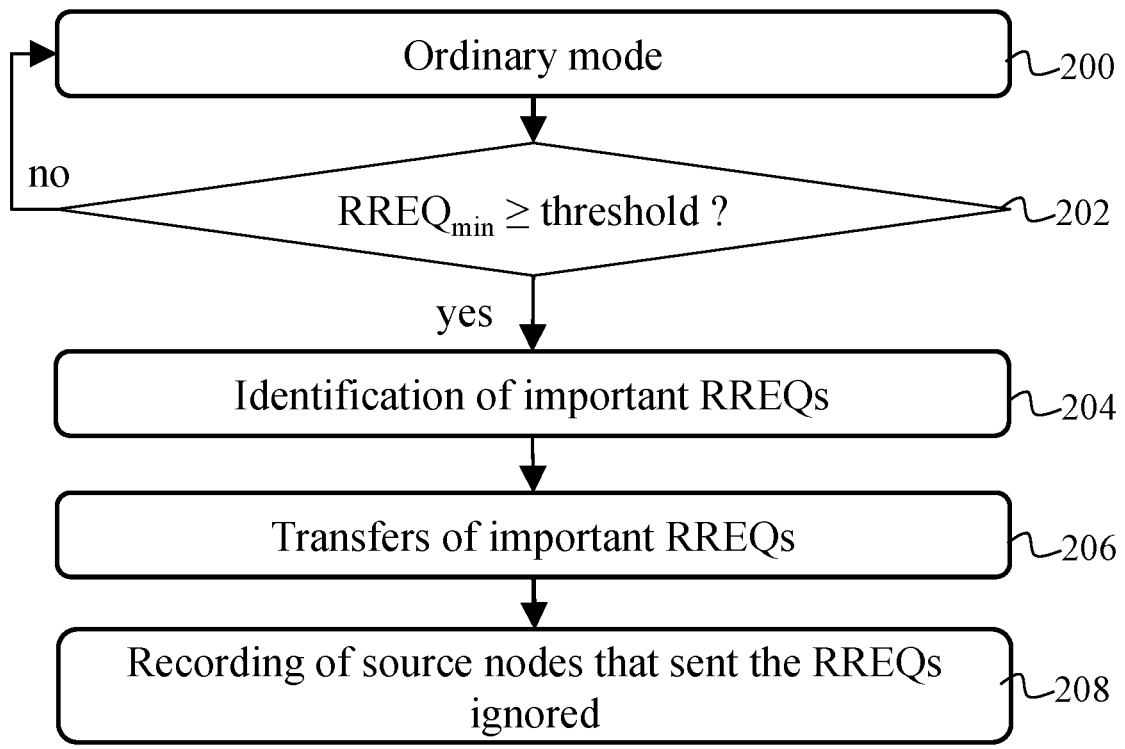
FIG. 2 illustrates schematically a regulation method intended to reduce congestion on the mesh communication network.

FIG. 2 illustrates schematically a regulation method intended to reduce congestion on a mesh communication network 120, implemented by a node device, referred to as an intermediate node device, of the mesh communication network 120. The intermediate node device is a node device of the mesh communication network 120 that receives route requests for which said intermediate node device is neither the source node nor the destination node.

In a first step 200, the intermediate node device is in the nominal mode. In the nominal mode, the intermediate node device relays each route request received to its network neighbourhood, or directly to the destination node device if said destination node device belongs to the network neighbourhood of the intermediate node device.

In a step 202, the intermediate node device determines whether it is in a congestion situation. For this purpose, the intermediate node device compares the number of route requests received over a time window of predefined duration with the saturation threshold. The predefined duration is for example one minute. If the number of route requests received over the time window of predefined duration exceeds the saturation threshold, the intermediate node device detects a congestion situation and goes into the degraded mode by performing a step 204. Otherwise the intermediate node device remains in the nominal mode corresponding to the step 200 and continues to relay by broadcast each route request received.

At the step 204, the intermediate node device identifies route requests as being important in order to favour the distribution of the corresponding routes. A route request is considered to be important at the intermediate node device when the number of said route request that is received on the time window of predefined duration, said route request being sent by the same source node device and comprising the same sequence number, is higher than a predefined second threshold, referred to as the minimum transmission threshold. This is because, the higher the number of any one route request received by an intermediate node device, the greater are the probabilities that said intermediate node device is fulfilling an important relay role for the route in question. Thus the intermediate node device can, in a congestion situation, favour the repair of the routes for which said intermediate node device is potentially fulfilling an important relay role.

In a step 206, the intermediate node device relays, to its network neighbourhood, the route requests identified as important at the step 204. Thus the intermediate node device limits the relaying of route requests received solely to the route requests considered to be important, which makes it possible to limit the congestion on the mesh communication network 120 and therefore to reduce congestion while allowing the repair of optimum routes.

According to a particular embodiment, the intermediate node device relays the route requests identified as important in a decreasing order according to the number of the same route request received over the time window of predefined duration. In other words, a route request wherein the number of route requests received is the highest is relayed as a priority. Furthermore, the intermediate node device stops the relaying of route discovery requests identified as important when a total number of route requests broadcast in the degraded mode reaches a predefined third threshold referred to as the maximum transmission threshold, and this even when some of the route requests identified as important at the step 204 have not yet been relayed. Thus, even when the intermediate node device potentially fulfils an important relay role for numerous routes, the quantity of route requests relayed remains limited. Furthermore, the intermediate node device favours the repair of routes for which its relay role in the route in question is potentially the most important.

In a step 208, the intermediate node device identifies, for each route request received and not relayed, the source node device that sent said route request. The intermediate device then records an identifier of each source node device thus identified.

Figure 3:
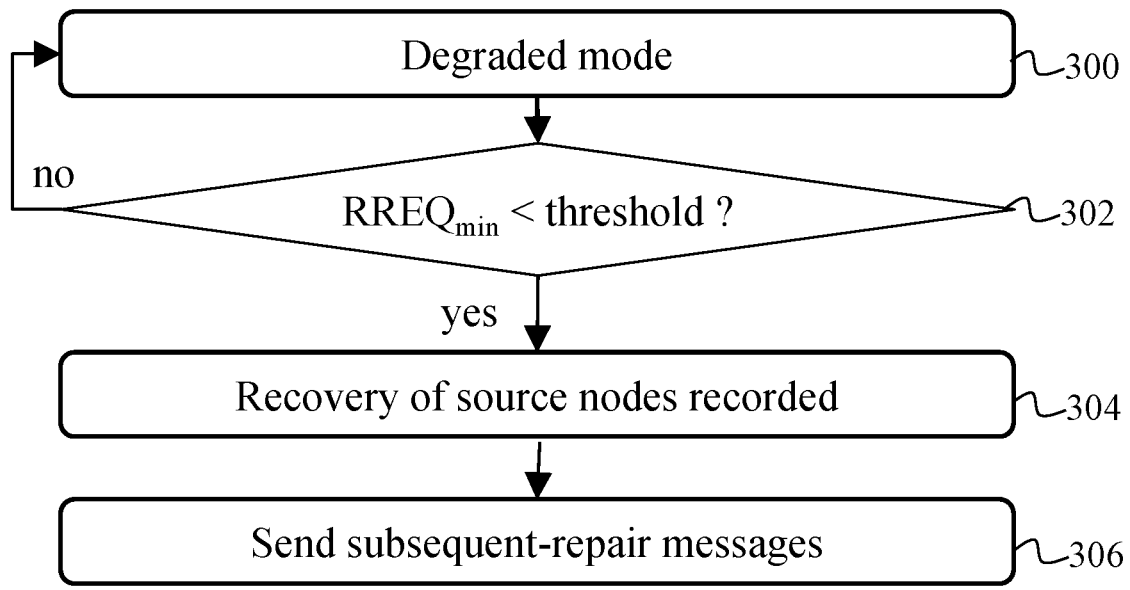
FIG. 3 illustrates schematically a subsequent repair method implemented following the regulation method intended to reduce congestion on the mesh communication network.

FIG. 3 illustrates schematically a subsequent repair method implemented by an intermediate node device following the regulation method intended to reduce congestion on the mesh communication network 120.

In a step 300, the intermediate node device is in the degraded mode.

In a step 302, the intermediate node device compares the total number of route requests received on the time window of predefined duration with the saturation threshold. If the total number of route requests received over the time window of predefined duration is below the saturation threshold, the intermediate node device detects the end of a congestion situation and performs steps 304 and 306 of subsequent repair. Furthermore, the intermediate node device goes once again into the nominal mode and resumes relaying each route request received. Thus the intermediate node device can detect the end of a congestion situation and resume systematic relaying of route requests received when the congestion on the mesh communication network 120 decreases.

In the contrary case, in other words if the total number of route requests received over the time window of predefined duration is above the saturation threshold, the intermediate node device remains in the degraded mode corresponding to the step 300 and continues the performance of the steps 204, 206 and 208 described previously in relation to FIG. 2.

At the step 304, the intermediate node device recovers the recorded identifiers of the source nodes that sent route requests that were not relayed in the degraded mode. The recorded identifiers correspond to the identifiers of the source nodes recorded at the step 208.

At the step 306, the intermediate node device sends to each source node the identifier of which has been recorded a message suggesting repair indicating that a route request previously sent has not been relayed and inviting sending a new route request. The message suggesting repair comprises information identifying the route.

This is because, since a route request sent by said source node was not relayed by the intermediate node device during the congestion situation, it is possible that the corresponding route that has been chosen is not optimum and that said route can potentially be improved by means of the sending of a new route request. Each message suggesting repair is sent by the intermediate node device at an instant defined by a duration determined as from the detection of the end of the congestion situation and comprising a minimum time to which a random duration is added. Thus the messages suggesting repair are sent at different instants, making it possible to distribute over time the transmission of messages in the mesh communication network 120 and to avoid a new congestion situation.

Figure 4:
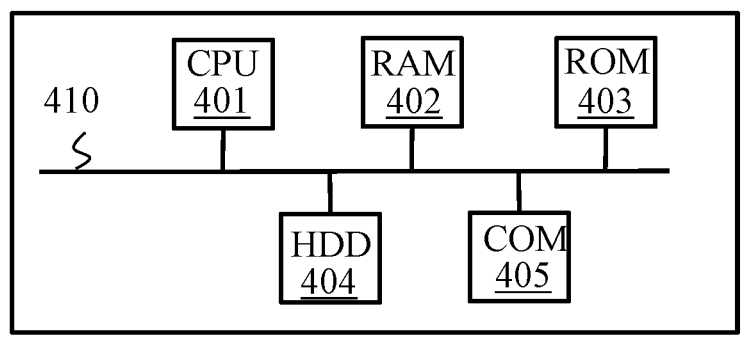
FIG. 4 illustrates schematically an example of hardware architecture of an intermediate node device.

FIG. 4 illustrates schematically the hardware architecture of an intermediate node device. The intermediate node device then comprises, connected by a communication bus 410; a processor or CPU (central processing unit) 401; a random access memory RAM 402; a read only memory ROM 403; a storage unit 404, such as a hard disk HDD (hard disc drive), or a storage medium reader, such as an SD ("Secure Digital") card reader; and an interface COM 405 for communicating with other node devices of the mesh communication network 120.

The processor CPU 401 is capable of executing instructions loaded in the RAM 402 from the ROM 403, from an external memory (such as an SD card), from a storage medium or from a communication network. When the intermediate node device is powered up, the processor CPU 401 is capable of reading instructions from the RAM 402 and executing them. These instructions form a computer program causing the implementation, by the processor CPU 401, of all or some of the steps described here in relation to the intermediate node device.

All or some of said steps can thus be implemented in software form by executing a set of instructions by a programmable machine, such as a DSP (digital signal processor) or a microcontroller, or be implemented in hardware form by a machine or a dedicated component, such as a FPGA (field-programmable gate array) or an ASIC (application-specific integrated circuit). In general terms, the intermediate node device thus comprises electronic circuitry configured for implementing all or some of the steps described here in relation to the intermediate node device.

The invention claimed is:

1. A regulation method intended to reduce congestion on a mesh communication network, the mesh communication network comprising a plurality of node devices communicating by powerline, a route request being sent by a source node device and the route request being relayed by gradual broadcasting by intermediate node devices to a destination node device, each intermediate node device being able to receive one or more copies of at least one route discovery requests, the regulation method being implemented by at least one intermediate node device among the intermediate node devices of the mesh communication network and wherein said method causes the at least one intermediate node device to perform:

detecting a congestion situation when a number of copies of route requests received over a time window of predefined duration is higher than a predefined first threshold, identifying, when the congestion situation is detected, route requests as being important, a route request being identified as important when the number of copies of said route request received over the time window of predefined duration is above a second predefined threshold, and relaying, by broadcasting in the mesh communication network, solely copies of the route requests identified as important.

2. The method according to claim 1, wherein said method causes the intermediate node to perform:

stopping the relaying of the copies of the route requests identified as important when a total number of copies of route requests identified as important and relayed after the congestion situation is detected reaches a predefined third threshold.

3. The method according to claim 1, wherein the relaying solely of the copies of the route requests identified as important is performed by relaying as a priority the route requests the number of which received by the intermediate node device is the highest.

4. The method according to claim 1, wherein said method causes the intermediate node to perform:

recording, for each route request not relayed, an identifier of the source node that sent said route request, detecting an end of a congestion situation when the number of copies of route requests received over the time window of predefined duration by the intermediate node device is lower than the predefined first threshold, and when the end of congestion situation is detected, sending, to each node device an identifier of which is recorded, an invitation to send a new route request.

5. The method according to claim 1, wherein the route requests are route discovery requests and/or route repair requests.

6. A non-transitory storage medium, that stores a computer program comprising instructions causing execution by a node device in a mesh communication network of the method according to claim 1, when said instructions are read and executed by a processor of said node device.

7. A node device, referred to as an intermediate node device, intended to be used in a mesh communication network, the mesh communication network comprising a plurality of node devices communicating by powerline, the mesh communication network being such that, when a route request is sent by a source node device, copies of the route request are relayed by gradual broadcasting by node devices to a destination node device, the intermediate node device being able to receive one or more copies of a route request, and wherein the node device comprises circuitry causing the node device to perform:

detecting a congestion situation when a number of copies of route requests received over a time window of predefined duration is higher than a predefined first threshold, identifying, when the congestion situation is detected, route requests as being important, a route request being identified as important when the number of copies of said route request received over the time window of predefined duration is higher than a predefined second threshold, and relaying by broadcasting in the mesh communication network, solely copies of the route requests identified as important.

* * * * *